358-69. XR 3,213,190 SR

T 6480
X 6532

Oct. 19, 1965 C. E. MUTSCHLER 3,213,190

COLOR BALANCE CONTROL FOR A SINGLE GUN COLOR TELEVISION RECEIVER

Filed May 9, 1960

INVENTOR.
CARL E. MUTSCHLER

BY
Fordyce A. Bothwell
ATTORNEY 3,213,190

COLOR BALANCE CONTROL FOR A SINGLE GUN COLOR TELEVISION RECEIVER

Carl E. Mutschler, Warminster, Pa., assignor, by mesne assignments, to Philco Corporation, Philadelphia, Pa., a corporation of Delaware Filed May 9, 1960, Ser. No. 27,565
3 Claims. (Cl. 178—5.4)

This invention relates to color television receivers and more particularly to receivers of the type employing a single index-type cathode ray tube which, in addition to producing the color image, produces an index signal indicative of the instantaneous position of the electron beam, such signal being utilized to effect proper coordination at each instant between chrominance modulation and position of said beam, which is essential for proper color rendition. Color television receivers of this type are now well known in the art, and therefore the following brief description thereof will suffice for the purpose of this specification.

First, with respect to the cathode ray tube, the screen thereof may comprise successive groups or series of light-emissive elements, the elements of each series being emissive of light of different primary colors in response to electron impingement. The screen further comprises means for producing the desired index signal, e.g. by secondary electron emission or by light emission. Preferably the colored light-emissive elements are in the form of stripes extending transversely to the direction of line scanning and arranged in triplets, each triplet comprising phosphor stripes respectively emissive of light of three primary colors such as red, green and blue. The means for producing the index signal preferably comprises stripe-like elemental areas in parallel relation to the colored light-producing stripes and positionally related thereto so that beam-scanning of the index stripes produces a desired signal. By way of example, there may be an index stripe for each of the color triplets, or there may be a different number of index stripes with provision for converting the frequency of the derived signal to the rate of beam traversal of the color triplets, as well understood in the art.

Next with respect to the reproduction of the colored image, it should be borne in mind that the now-standard composite color television signal comprises the luminance or brightness signal, the chrominance or color signal which is transmitted as amplitude and phase modulation of a color sub-carrier in the upper portion of the video band, and the color reference signal consisting of bursts of the unmodulated sub-carrier occurring during the blanking intervals immediately following the horizontal synchronizing pulses.

In a receiver of the type here involved, the color writing frequency, usually 6 mc., is the nominal rate at which the electron beam traverses the color triplets, i.e. the number of triplets traversed per second. For proper reproduction of the color image, it is necessary to produce a color writing signal at the writing frequency containing the color information of the chrominance signal, and it is also necessary to effect proper coordination at each instant between chrominance modulation and position of said beam according to the indexing information of the index signal.

At the receiver, the above-mentioned components are derived from the received composite color television signal, and the chrominance component is processed to produce a color writing signal whose instantaneous phase is properly coordinated with the position of the electron beam. The index signal is utilized to effect this coordination, as well understood in the art.

In any color television receiver, the color phosphors employed inherently tend to have different efficiencies in their emission of colored light, which militates against color balance in the reproduced image and tends to interfere with the faithful reproduction of an object or scene in its true natural colors. With respect to the color phosphors available up to the present time, the red light-emitting phosphor is less efficient than the green and blue light-emissive phosphors. In receivers which employ the so-called shadow mask cathode ray tube having a plurality of electron guns, the above-mentioned objection may be overcome by imparting different intensities to the electron beams so as to compensate for the different efficiencies of the phosphors, for example by different biasing of electrodes of the cathode ray tube. However, this remedy is not applicable to the index-type cathode ray tube which has only one image-producing electron beam.

In the case of the index-type cathode ray tube, the above-mentioned objection may be overcome by corrective action with respect to the phosphors themselves, for example by changing the diluents of the phosphors to equalize their efficiencies or by changing the relative widths of the phosphor stripes. However, such methods are cumbersome, time-consuming and expensive.

The principal object of the present invention is to provide a simple and inexpensive solution of the aforestated problem.

Another object of the invention is to overcome the above-mentioned objection electrically rather than mechanically.

Other objects and features of the invention will be apparent from the description to follow.

In accordance with this invention, the above-mentioned objection is overcome by automatically changing the intensity of the electron beam, as it impinges the successive elements or stripes emissive of different colored light, so as to compensate for the different efficiencies of the phosphor stripes. This is accomplished by adding to the writing signal a compensating signal so related in frequency and phase to the writing signal and of such amplitude that it effects adjustments of the beam intensity which compensate for the different efficiencies of the phosphor stripes. Preferably the indexing signal itself is used as the compensating signal, with proper phase and amplitude adjustment to serve the desired purpose. Also preferably the compensating signal is modulated with the luminance signal so as to provide the correct compensation at all levels of brightness.

The invention may be fully understood from the following detailed description with reference to the accompanying drawing wherein.

Figures 1, 2, 3:
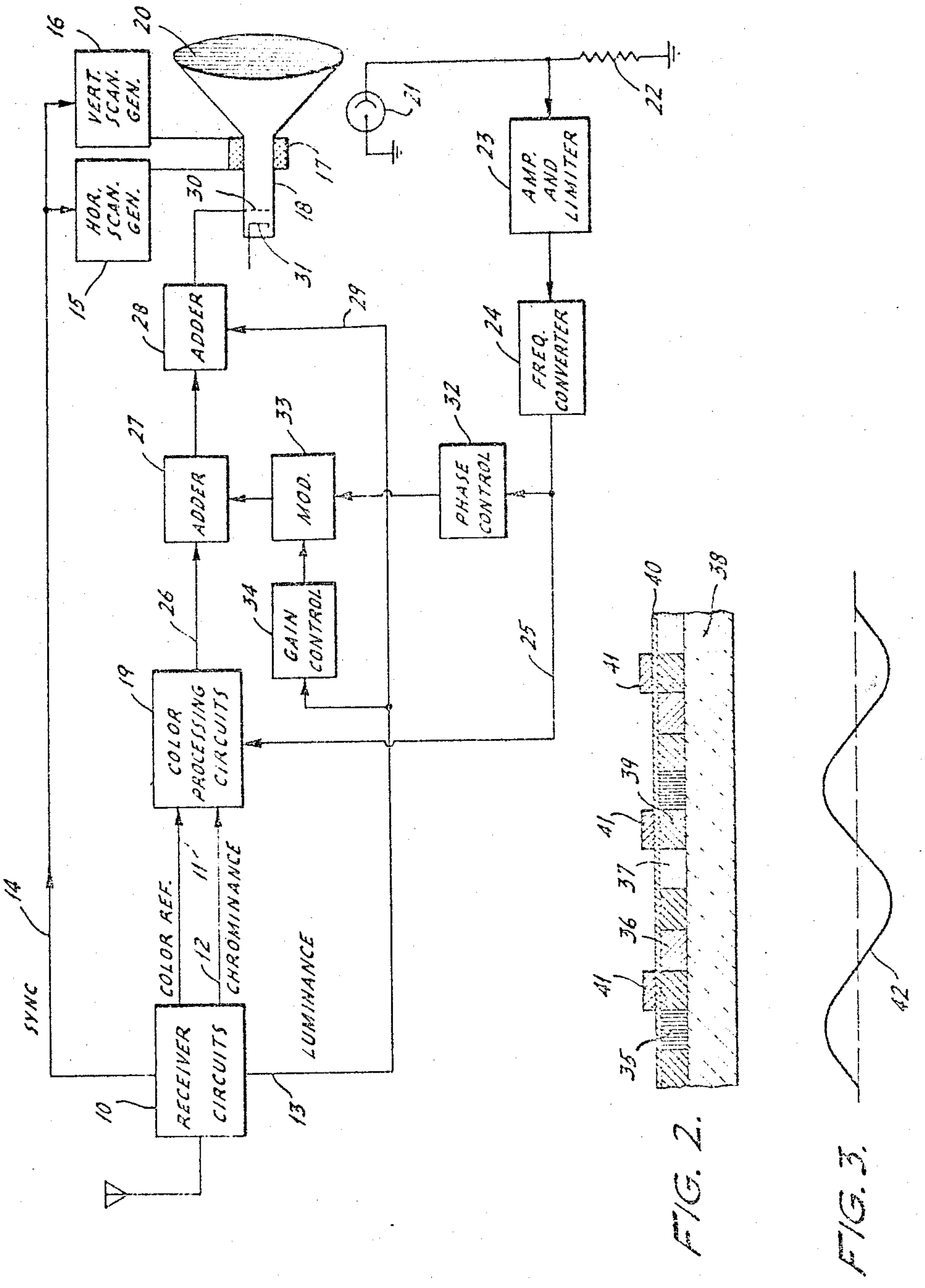
FIG. 1 is a block diagram of a color television receiver embodying the preferred form of this invention.
FIG. 2 is a magnified sectional plan view of a portion of a screen structure which may be employed in the cathode ray tube of the receiver.
FIG. 3 shows a compensating signal which may be employed.

Referring more particularly to the drawing, block 10 represents the conventional receiver circuits by which the component signals of the received composite color signal are derived. The circuits within block 10 also include the conventional means for utilizing the bursts to produce a continuous color reference signal. The signals emanating from block 10 include the color reference signal derived at output connection 11, the chrominance signal derived at output connection 12, and the luminance or brightness signal derived at output connection 13. The composite signal also includes the usual deflection synchronizing signals which are separated and supplied over output connection 14 to the scanning circuits 15 and 16 which in turn supply deflection currents to the yoke 17 associated with the color image-producing cathode ray tube 18 which is of the index type as hereinbefore described.

The color reference signal and the chrominance or chroma signal are supplied to the color processing circuits represented by block 19, as is also the index signal which preferably is produced by light emission from index elements of the screen 20. These elements may be formed of fluorescent material, such as zinc oxide, which emits non-visible light in response to electron impingement. The phototube 21, which is preferably a photomultiplier tube, receives light pulses from said elements as the electron beam scans across the screen and produces the index signal across resistor 22. The index signal as usual is supplied to an amplifier and limiter 23, and in the case of the screen structure shown in FIG. 2 hereinafter described the frequency of the index signal is converted to writing frequency in frequency converter 24. The index signal is then supplied to the color processing circuits over connection 25 and it serves to effect proper phasing of the color writing signal which is derived at output connection 26. Disregarding adder 27 for the moment, the color writing signal is supplied to adder 28 to which the luminance signal is also supplied over connection 29. The added signals are supplied to the control grid 30 of the cathode ray tube to modulate the electron beam. For simplicity, only the control grid and the cathode 31 are shown, but it will be understood the cathode ray tube also has the other conventional elements.

As thus far described, the system is of known form. In accordance with this invention, the aforementioned compensation for the different efficiencies of the phosphor elements of the screen 20 is effected by automatically changing the intensity of the electron beam in cathode ray tube 18, as it impinges the successive color stripes, so as to achieve the desired compensation. This is achieved by adding a suitable compensating signal to the color writing signal. The compensating signal is of such frequency, phase and amplitude that it varies the intensity of the electron beam, as it traverses the phosphor stripes of each triplet, in inverse relation to said different efficiencies so as to compensate therefor. In the preferred embodiment illustrated, the index signal is utilized for this purpose, in addition to its utilization to effect the aforementioned coordination between chrominance modulation and position of the electron beam.

As illustrated the index signal is also supplied to adder 27 through a conventional phase control device 32. Preferably the index signal, adjusted to proper phase, is modulated with the luminance signal in modulator 33. As previously mentioned, the purpose of this is to provide the correct compensation at all levels of brightness. A conventional gain control device 34 is provided for adjustment of the amplitude of the modulating luminance signal. The derived compensating signal is added to the color writing signal in adder 27.

With proper amplitude and phase adjustment, the compensating signal effects variation of the beam intensity, as it traverses the color stripes of each triplet, in such manner as to compensate for the different efficiencies of the phosphors and to effect color balance in the reproduced image.

Referring now to FIG. 2 there is shown a possible known form of screen structure for use in the cathode ray tube in the system of FIG. 1. The red, green and blue light-emissive phosphor stripes 35, 36 and 37 may be deposited on faceplate 38 of the cathode ray tube with opaque stripes 39 between them. An electron-permeable light-reflective layer 40, preferably an aluminum layer, is deposited on the stripes. The index stripes 41 are deposited on the aluminum layer behind alternate opaque stripes. This arrangement produces an index signal having a frequency $3/2f$, where $f$ is the color writing frequency, which is converted to the frequency $f$ in the frequency converter 24.

FIG. 3 shows the compensating signal 42 which effects compensation for the lower efficiency of the red light-emissive phosphor in comparison to the green and blue light-emissive phosphors. The effect of this signal is to increase the intensity of the electron beam as it passes over the less efficient red light-emissive stripes and to decrease the intensity of the beam slightly as it passes over the more efficient green and blue light-emissive stripes. For simplicity the luminance modulation of the compensating signal is omitted.

While a preferred embodiment of the invention has been illustrated and described, it will be understood that the invention is not limited thereto but contemplates such modifications and other embodiments as may occur to those skilled in the art.

I claim:

1. In a color television receiver for reception of a composite color signal having luminance and chrominance component signals, said receiver including a cathode ray tube in which successive groups or series of colored light-emissive phosphor elements are successively impinged by an electron beam which is modulated by a color writing signal produced from said chrominance signal, at least one of the phosphor elements in each of said series inherently having a different efficiency than the others which militates against color balance and faithful reproduction of the color image, means for producing a compensating signal having a frequency corresponding to the rate of beam traversal of said series, means for adjusting the phase of said compensating signal, means for modulating said compensating signal with said luminance signal, and means for utilizing the modulated compensating signal to vary the intensity of said beam, as it traverses the phosphor elements of each of said series, in a manner substantially to compensate for the different efficiencies of said elements at all levels of brightness.

2. In a color television receiver for reception of a composite color signal having luminance and chrominance component signals, said receiver including a cathode ray tube in which successive groups or series of colored light-emissive phosphor elements are successively impinged by an electron beam which is modulated by a color writing signal produced from said chrominance signal, and wherein an index signal is produced for phasing said color writing signal, at least one of the phosphor elements in each of said series inherently having a different efficiency than the others which militates against color balance and faithful reproduction of the color image, means for deriving said index signal for the additional purpose of compensation for the different efficiencies of said elements, means for adjusting the phase of the derived index signal, means for modulating the phase adjusted signal with said luminance signal, and means for adding the modulated signal to said color writing signal to vary the intensity of said beam, as it traverses the phosphor elements in each of said series, in a manner substantially to compensate for the different efficiencies of said elements at all levels of brightness.

3. In a color television receiver for reception of a composite color signal having luminance and chrominance component signals, a color image-reproducing cathode ray tube having a screen containing successive groups or series of colored light-emissive phosphor stripes extending transversely to the direction of line scanning by an electron beam, said screen also having index stripes in parallel relation to said phosphor stripes for producing an index signal, means for modulating said beam with a color writing signal produced from said chrominance signal, the respective phosphor stripes in each of said series producing light of different primary colors, at least one of the phosphor stripes in each of said series inherently having a different efficiency than the others, means responsive to said index signal for effecting proper phasing of said color writing signal, means for deriving said index signal for the additional purpose of compensation for the different efficiencies of said phosphor stripes, means for modulating the derived index signal with said luminance signal, and means for adding the modulated signal to said color writing signal to vary the intensity of said beam, as it traverses the phosphor stripes of each of said series, in a manner substantially to compensate for the different efficiencies of said phosphor stripes.

References Cited by the Examiner

UNITED STATES PATENTS

| | | | |
|---|---|---|---|
| 2,848,531 | 8/58 | Creamer et al. | 178—5.4 |
| 2,887,528 | 5/59 | Rhodes | 178—5.4 |
| 2,924,649 | 2/60 | Pritchard | 178—5.4 |
| 2,955,152 | 10/60 | Keizer | 178—5.4 |

OTHER REFERENCES

"Television," 2nd ed. by Zworykin and Morton; John Wiley and Sons, Inc., New York; copyright 1954; pages 912–915.

DAVID G. REDINBAUGH, *Primary Examiner.*

NEWTON N. LOVEWELL, ROBERT SEGAL, *Examiners.*